United States Patent
Boesch

(10) Patent No.: US 6,556,545 B1
(45) Date of Patent: Apr. 29, 2003

(54) FREQUENCY GENERATION FOR CDMA TERMINAL WITH SLOTTED RECEIVE MODE

(75) Inventor: Ronald D. Boesch, Morrisville, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/468,522

(22) Filed: Dec. 21, 1999

(51) Int. Cl.$^7$ ................................................ H04L 5/16
(52) U.S. Cl. ........................................ 370/278; 455/76
(58) Field of Search ................................. 370/276, 277, 370/278, 280, 281, 294, 295, 344; 455/76, 78–83, 437

(56) References Cited

U.S. PATENT DOCUMENTS 5,963,852 A    10/1999  Schlang et al.
6,112,059 A  *  8/2000  Schwent et al. ............ 455/67.1

FOREIGN PATENT DOCUMENTS

WO     WO 99/26336    5/1999

* cited by examiner

Primary Examiner—Nguyen T. Vo
(74) Attorney, Agent, or Firm—Coats & Bennett, P.L.L.C.

(57) ABSTRACT

An RF full-duplex communication device operates in a selected range of channels spaced by a selected increment. A transmitter and a receiver are connected to a duplex filter for simultaneously transmitting and receiving signals. A low frequency offset channel stepper is adapted to selectively shift frequency either the designated duplex spacing or offset therefrom. A high frequency channel stepper is connected to the transmitter and selectively connected to the receiver either directly or through the low frequency offset channel stepper, where the high frequency channel stepper is adapted to selectively shift frequency in steps substantially equal to the selected increment. A controller is adapted to (a) selectively connect the high frequency channel stepper directly to the receiver when the device is in a camping mode not transmitting a signal, (b) selectively connect the high frequency channel stepper to the receiver through the low frequency offset channel stepper and cause the low frequency offset channel stepper to shift frequency the normal duplex spacing when the device is in a normal communicating mode, and (c) selectively connect the high frequency channel stepper to the receiver through the low frequency offset channel stepper and cause the low frequency offset channel stepper to shift frequency on the incrementally spaced grid when the device is in a slotted communicating mode. The controller controls a switch for connecting or disconnecting the low frequency offset channel stepper from the receiver.

22 Claims, 3 Drawing Sheets

FREQUENCY GENERATION FOR CDMA TERMINAL WITH SLOTTED RECEIVE MODE

BACKGROUND OF THE INVENTION

1. Technical Field

The present invention is directed toward communication devices, and more particularly toward full-duplex radio frequency communication devices.

2. Background Art

Radio frequency (RF) communication systems, such as cellular telephone systems, are designed to handle maximum capacity with limited channel frequencies. A time division multiple access (TDMA) system subdivides time on each frequency into time slots that can be assigned to different users. A code division multiple access (CDMA) system, including wideband CDMA (WCDMA), spreads a digitized signal using a code and utilizes the assigned frequency at all times.

During operation, a cellular communication device may be required to engage in an inter-frequency handover or handoff. To perform a handoff, the cellular communication device receiver must perform certain activities such as making power measurements, acquiring control channels and/or engage in handoffs. These activities require the cellular communication device to receive signals on two separate frequencies.

The standard structure for allowing such operation is to have two receivers, from RF to baseband, so that each receiver will be able to make its required measurements while on a call and/or receiving data. However, use of two complete receivers is not economical for such communication devices, particularly given the cost competition that is well-known in various telecommunications markets.

Another solution is to use a slotted mode for the receiver, wherein a time slot is created for measurements without breaking the continuous receive link. The created slot enables the receiver to jump to a different frequency to make power measurements and/or acquire control channels. This solution allows for the sharing of the entire receive chain, but also requires that the device have two full channel stepping synthesizers, since transmission may still occur while a new receive frequency is being detected.

Normal full-duplex CW radios have a fixed spacing between the transmit frequency and the receive frequency (e.g., 190 MHz in the case of the known non-US $3^{rd}$ generation spectrum). Typically, a single channel stepper is used with an offset loop to provide the fixed spacing. The channel stepper generates the frequency for the receiver and the offset loop generates the transmit frequency using the fixed spacing. However, when a new receive frequency has to be used, the fixed relationship between the transmit and receive frequencies is broken so that one 2 GHz stepping synthesizer is not sufficient. Typically, 2 GHz is appropriate for the $3^{rd}$ generation non-US spectrum with frequencies in the transmit band from 1920 MHz to 1980 MHz on a 200 KHz grid and for frequencies in the receive band from 2110 MHz to 2170 MHz that may also be on a 200 KHz grid. While slotted mode operation can eliminate the need for two costly receivers, in the $3^{rd}$ generation non-US spectrum example given, two 2 GHz channel steppers (one for receive and one for transmit) may still be required since there is no continuously fixed spacing between the receive and transmit frequencies. The known difficulty with making such high frequency channel steppers can translate to high costs and high current consumption.

Consequently, a need exists for minimizing radio hardware necessary for performing activities and/or measurements associated with an inter-frequency handover that may be required in a telecommunication system operating in a non-TDMA standard, such as, for example, the WCDMA standard.

The present invention is directed toward overcoming one or more of the problems set forth above.

SUMMARY OF THE INVENTION

It is an object of the invention to provide a low cost RF full-duplex communication device which uses minimal current.

It is a further object of the present invention to attend to the inter-frequency receive activities required in WCDMA systems with a minimum of radio hardware.

It is a feature of the invention to utilize a sole transmitter and a sole receiver.

It is a further feature of the present invention to assign a high frequency channel stepper directly to the generation of a transmit signal.

In one aspect of the present invention, a communication device is provided for full-duplex radio communication in a selected range of channels where the channels are spaced by a selected increment. A transmitter and a receiver are connected to a duplexer for simultaneously transmitting and receiving signals. A high frequency channel stepper is connected to the transmitter to selectively shift frequency in steps substantially equal to the selected increment. A low frequency offset channel stepper is selectively connected between the high frequency channel stepper and the receiver and is adapted to selectively shift frequency either a first selected offset amount or one or more out of a selected set of offset amounts.

In one embodiment of the invention, the first-selected offset amount is a designated duplex spacing between the transmit frequency and the receive frequency.

In another embodiment of the invention, the selected set of offset amounts are different from the first selected offset amount.

In still another embodiment, a controller is provided and adapted to (a) selectively connect the high frequency channel stepper directly to the receiver when the device is in a camping mode not transmitting a signal, (b) selectively connect the high frequency channel stepper through the low frequency offset channel stepper and cause the low frequency offset channel stepper to shift frequency the first selected offset amount when the device is in a normal communicating mode, and (c) selectively connect the high frequency channel stepper through the low frequency offset channel stepper and cause the low frequency offset channel stepper to shift frequency at least one of the selected set of offset amounts when the device is in a slotted communicating mode.

In yet another embodiment, a switch is provided having a first position connecting the high frequency channel stepper to the receiver through the low frequency offset channel stepper and a second position connecting the high frequency channel stepper directly to the receiver.

An advantage of the present invention is that manufacturing costs are decreased.

Another advantage of the present invention is that current consumption is reduced during camping mode.

DETAILED DESCRIPTION OF THE INVENTION

Figure 1:
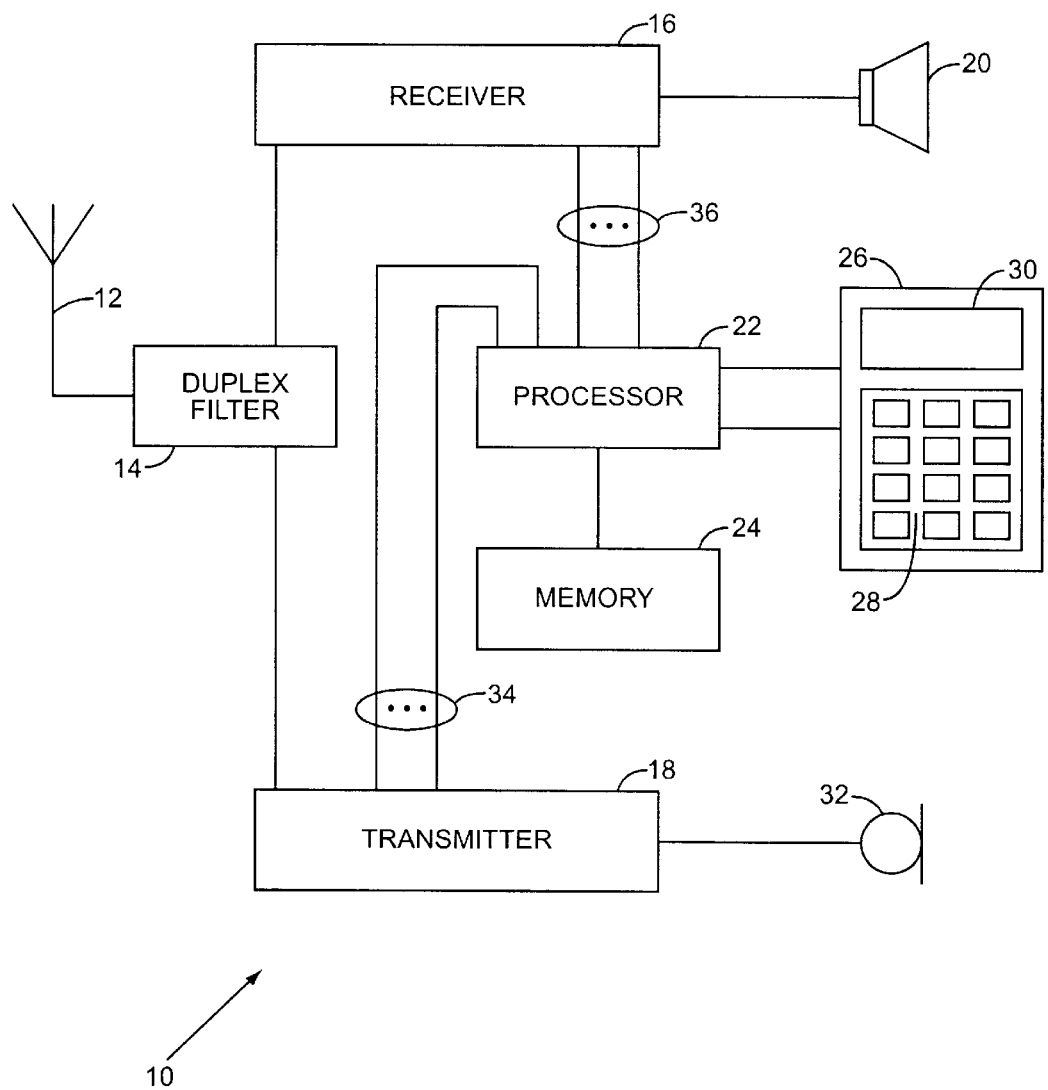
FIG. 1 is a block diagram of a communication device utilizing frequency generation in accordance with the present invention.

FIG. 1 is a block diagram of a radio frequency (RF) communication device using a slotted receive mode for frequency generation in accordance with the invention. In the illustrated embodiment of the invention, the communications device 10 may be a mobile station (also called a wireless telephone, cellular telephone or cell phone). The mobile station 10 includes an antenna 12 for sending and receiving radio signals between itself and a wireless network. The antenna 12 is connected to a duplex filter 14 which enables a receiver 16 and a transmitter 18 to receive and broadcast (respectively) on the same antenna 12. The receiver 16 demodulates, demultiplexes and decodes the radio signals into one or more channels. Such channels include a control channel and a traffic channel for speech or data. The speech or data are delivered to speaker 20 (or other output device, such as a modem or fax connector).

The receiver 16 delivers messages from the control channel to a controller in the form of a processor 22. The processor 22 controls and coordinates the functioning of the mobile station 10 responsive to messages on the control channel using programs and data stored in a memory 24, so that mobile station 10 can operate within the wireless network. The processor 22 also controls the operation of the mobile station 10 responsive to input from a user interface 26. The user interface 26 includes a keypad 28 as a user-input device and a display 30 to give the user information. Other devices are frequently included in the user interface 26, such as lights and special purpose buttons. The processor 22 controls the operations of the transmitter 18 and the receiver 16 over control lines 34 and 36, respectively, responsive to control messages and user input.

The microphone 32 receives speech signal input and converts the input into analog electrical signals. The analog electrical signals are delivered to the transmitter 18. The transmitter 18 converts the analog electrical signals into digital data, and along with any other digital data, encodes the data with error detection and correction information and multiplexes this data with control messages from the processor 22. The transmitter 18 modulates this combined data stream and broadcasts the resultant radio signals to the wireless network through the duplex filter 14 and the antenna 12.

The present invention relates to systems where the receiver 16 must alternate between different frequencies while the transmitter 18 is active on a single frequency. For example, in cellular telephone systems as mentioned above the receiver is required to leave the voice or data channel in order to acquire control channels or engage in handoff to different cells.

Figure 2:
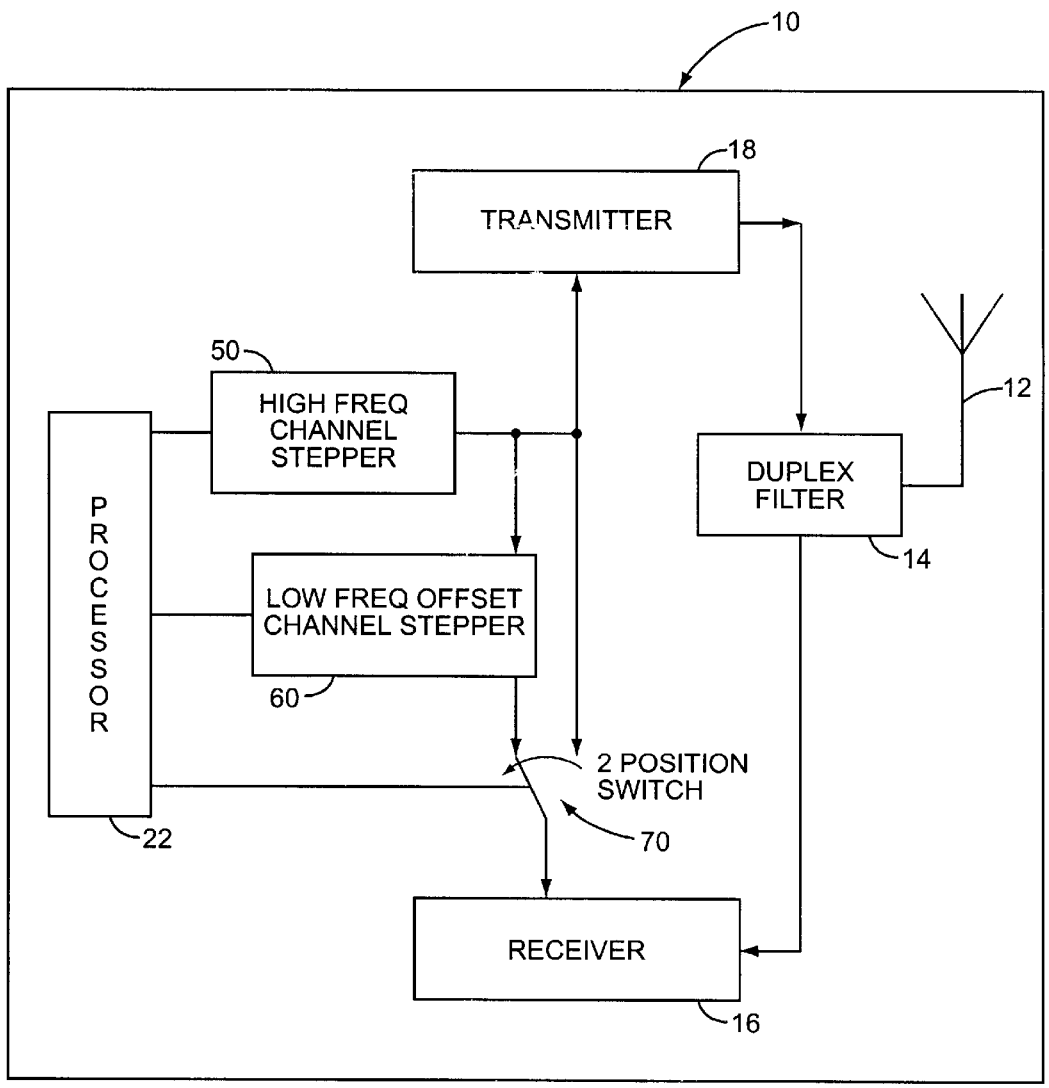
FIG. 2 is a detailed block diagram illustrating frequency generation apparatus of the communications device of FIG. 1 in accordance with the invention.

Referring to FIG. 2, a high frequency channel stepper 50 is directly connected to the transmitter 18 to set the transmit local oscillator (LO) frequency. With an on channel transmitter, the transmit frequency equals the LO frequency, as is known. With an offset transmitter, the LO frequency and the transmit frequency differ by the offset amount. The high frequency channel stepper 50 is able to step along the channel spacing of the communication standard with which the mobile station 10 is to be used. For example, in the case of the WCDMA standard, the channels are on a 200 KHz grid (i.e., at 200 KHz incremental spacing) within an assigned frequency range for the system, and the high frequency channel stepper 50 in a mobile station 10 for use in such a system changes frequency in 200 KHz increments. As another example, the AMPs standard is built on a 30 KHz grid, and the high frequency channel stepper 50 in mobile stations 10 for use in such systems would change frequency in 30 KHz increments.

While examples of channel steppers are given herein to illustrate the invention, it should be understood that the channel steppers of the present invention are not to be limited to particular embodiments or to particular examples given. That is, it should be understood within the scope of the present invention that the channel stepper may comprise any frequency source which can be stepped along the channel spacing of a communications standard. For example, phase locked loops (PLLs) or DDSs (direct digital synthesis) could be used. Further, while the particular embodiment is discussed herein in connection with particular standards (e.g., the $3^{rd}$ generation non-US spectrum with frequencies in the transmit band from 1920 MHz to 1980 MHz on a 200 KHz grid and for frequencies in the receive band from 2110 MHz to 2170 MHz that may also be on a 200 KHz grid), it should be understood that the present invention could be readily used with different standards using different frequencies, different channels and channel spacing, etc.

A low frequency offset channel stepper 60 is operatively associated with the high frequency channel stepper 50 to selectively establish the LO receive frequency of the receiver 16. As, above, the actual receive frequency might be offset from the LO frequency. The offset channel stepper 60 translates the frequency from the high frequency channel stepper 50 to another frequency. The frequency translation may be done, for example, with an analog mixer or other known translating devices. The receiver frequency is generated with the offset channel stepper 60 at a much lower frequency and must be stepped in a 200 KHz grid in the exemplary system for new frequency offset requirements to make power measurements and acquire control channels at the new frequency. During a call, the offset channel stepper is at the normal duplex frequency. The normal duplex frequency is a selected offset amount relative to the transmitter frequency. Again, this is 190 MHz in the known non-US $3^{rd}$ generation spectrum example. During slotted mode the offset stepper is moved or jogged to the new required frequency. The new required frequency is selected from a set of offset amounts according to the particular communication system.

A suitable two position switch 70 selectively connects either the high frequency channel stepper 50 or the offset channel stepper 60 to the receiver 16. In a normal position, shown in FIG. 2, the receiver frequency is set by the high frequency channel stepper 50 and the low frequency offset channel stepper 60 as is described below. In a second position, the receiver frequency is set by the high frequency channel stepper 50. The use of the low frequency channel stepper 60 with the high frequency channel stepper 50 is less expensive and uses less current than systems using two high frequency channel steppers.

The processor 22 controls the high frequency channel stepper 50, the low frequency offset channel stepper 60 and the switch 70 to operate as described in greater detail below. It should be recognized that a processor 22 or other control device of any type which can be made to cause the mobile station 10 to operate as described below would be suitable.

Figure 3:
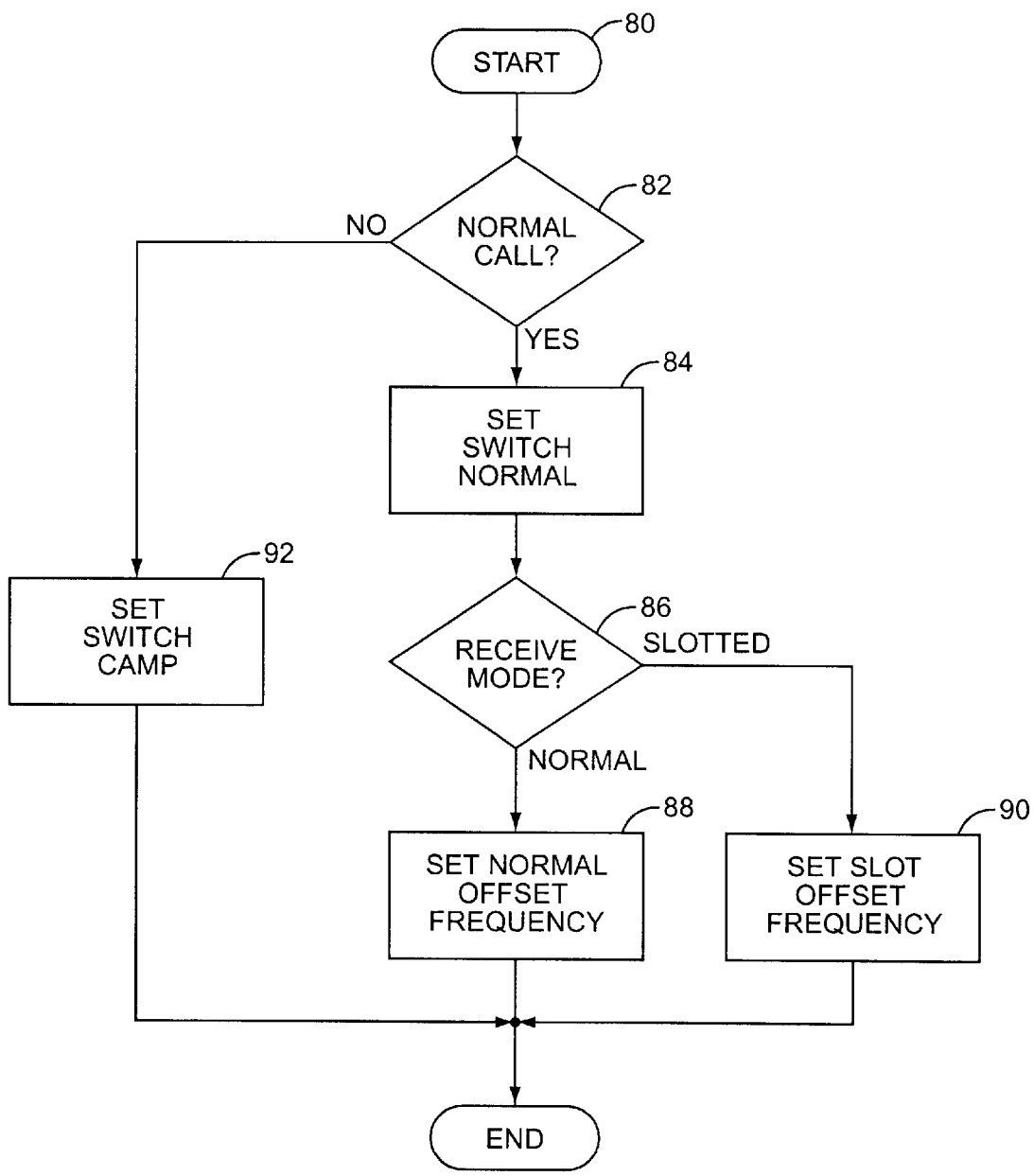
FIG. 3 is a flow diagram illustrating a program implemented in the processor of FIG. 2 to control operation of the frequency generation apparatus.

Operation of the processor 22 is controlled by a program represented by the flow diagram of FIG. 3. The program begins at a start node 80. A decision block 82 determines if the mobile station 10 is processing a call. If so, then at a block 84, the switch 70 is set in the normal position shown in FIG. 2 whereby both channel steppers 50 and 60 cooperate to establish the receive frequency. A decision block 86 determines the mode of the receiver 16. If the receiver 16 is in a normal mode, then the low frequency channel stepper 60 is set to the normal offset call frequency at a block 88. With the low frequency offset channel stepper 60 at the normal offset call frequency the receive frequency is at the normal "fixed spacing" from the transmit frequency. It will be understood by those skilled in this art that offset transmitters and receivers of this type operate with an intermediate frequency (IF) when translating signals, as use of an IF makes filtering easier and less current is used. If the mobile station 10 of the present invention is used with an IF, if for example a heterodyne receiver is used, it should be understood that the offset provided by the low frequency offset channel stepper 60 would then be the normal duplex spacing +/− the receiver IF. Any transmitter IF is also taken into account in determining offset spacing, as is apparent by also modifying the normal duplex spacing +/− the associated transmitter IF.

During slotted mode, the low frequency offset channel stepper 60 is set at a block 90 to an offset slot frequency. This jogs the receive frequency spaced from the transmission frequency by an amount unequal to the normal duplex spacing. If the mobile station 10 of the present invention is used with an IF, it should be understood that the offset provided by the low frequency offset channel stepper 60 would then be the slotted duplex spacing +/− the IF. Therefore, the transmitter 18 may continue to operate at its assigned frequency as is required, while the receiver 16 may operate at a different frequency to perform desired functions, such as making power measurements and/or acquiring control channels. The mobile station 10 may checks signals at several different offset frequencies based on the duplex spacing to locate a frequency with a good signal. Such frequency steps may be selected by the phone service provider in accordance with the frequencies assigned to it. From either block 88 or 90 the routine ends.

When a hard handover occurs, the low frequency offset channel stepper 60 is returned to its normal duplex value (the normal "fixed spacing") since the high frequency channel stepper 50 in the handover moves to the new transmit frequency.

When the mobile station 10 is in a camping or standby more (i.e., receiving information from the base station but not making or receiving a call), as determined at the block 82, the switch 70 is placed in its other position so that the high frequency channel stepper 50 is directly connected to the receiver 16 without the low frequency offset channel stepper 60. Thus, the low frequency offset channel stepper 60 is not used and may be turned off, thereby minimizing power usage. The offset provided by the low frequency offset channel stepper 60 is not required during camping mode because the transmitter 18 is not required during camping mode. The routine then ends.

It should thus be appreciated that the present invention will provide the desired operation with only one of the relatively high cost and relatively high current usage high frequency channel steppers, thereby saving significantly over mobile stations which require either two receivers or at least two high frequency channel steppers.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A communication device for full-duplex RF communication in a selected range of channels, said channels being spaced by a selected increment, said device comprising:

a transmitter and a receiver connected to a duplex filter for simultaneously transmitting and receiving signals;

a high frequency channel stepper connected to said transmitter to selectively shift transmit frequency in steps substantially equal to said selected increment; and a low frequency offset channel stepper selectively connected between said high frequency channel stepper and said receiver adapted to selectively shift receive frequency from transmit frequency either a first selected offset amount or one or more out of a selected set of offset amounts.

2. The device of claim 1, wherein said first selected offset amount provides a designated duplex spacing between the transmit frequency and the receive frequency.

3. The device of claim 1, wherein said first selected offset amount provides a designated duplex spacing +/− an associated receiver intermediate frequency and +/− an associated transmitter intermediate frequency.

4. The device of claim 1, wherein said selected set of offset amounts are different from said first selected offset amount.

5. The device of claim 1, further comprising a controller adapted to:

selectively connect said high frequency channel stepper directly to said receiver when said device is in a camping mode not transmitting a signal;

selectively connect said high frequency channel stepper to said receiver through said low frequency offset channel stepper and cause said low frequency offset channel stepper to shift frequency the first selected offset amount when said device is in a normal communicating mode; and selectively connect said high frequency channel stepper to said receiver through said low frequency offset channel stepper and cause said low frequency offset channel stepper to shift frequency at least one of the selected set of offset amounts when said device is in a slotted communicating mode.

6. The device of claim 1, further comprising a switch having a first position connecting said high frequency channel stepper to said receiver through said low frequency offset channel stepper and a second position connecting said high frequency channel stepper directly to said receiver.

7. The device of claim 1, wherein said first selected offset amount provides a designated duplex spacing +/− an associated receiver intermediate frequency.

8. The device of claim 1, wherein said first selected offset amount provides a designated duplex spacing +/− an associated transmitter intermediate frequency.

9. A communication device for full-duplex RF communication in a selected range of channels, said channels being spaced by a selected increment, said device comprising:

a transmitter and a receiver connected to a duplex filter for simultaneously transmitting and receiving signals;

a high frequency channel stepper connected to said transmitter, said high frequency channel stepper adapted to selectively shift transmit frequency in steps substantially equal to said selected increment; and a low frequency offset channel stepper operatively connected between said high frequency channel stepper and said receiver and adapted to selectively shift receive frequency either a first selected offset amount between the transmit frequency and the receive frequency, or one or more out of a selected set of offset amounts.

10. The device of claim 9, wherein said first selected offset amount provides a designated normal duplex spacing between the transmit frequency and the receive frequency.

11. The device of claim 9, wherein said first selected offset amount provides a designated duplex spacing +/− an associated receiver intermediate frequency and +/− an associated transmitter intermediate frequency.

12. The device of claim 9, further comprising a controller adapted to:

selectively connect said high frequency channel stepper directly to said receiver when said device is in a camping mode not transmitting a signal;

selectively connect said high frequency channel stepper to said receiver through said low frequency offset channel stepper and cause said low frequency offset channel stepper to shift frequency the first selected offset amount when said device is in a normal communicating mode; and selectively connect said high frequency channel stepper to said receiver through said low frequency offset channel stepper and cause said low frequency offset channel stepper to shift frequency at least one of the selected set of offset amounts when said device is in a slotted communicating mode.

13. The device of claim 9, further comprising a switch having a first position connecting said high frequency channel stepper to said receiver through said low frequency offset channel stepper and a second position connecting said high frequency channel stepper directly to said receiver.

14. The device of claim 9, wherein said first selected offset amount provides a designated duplex spacing +/− an associated receiver intermediate frequency.

15. The device of claim 9, wherein said first selected offset amount provides a designated duplex spacing +/− an associated transmitter intermediate frequency.

16. The method of controlling a communication device for full-duplex RF communication in a selected range of channels, said channels being spaced by a selected increment, said method comprising the steps of:

providing a transmitter and a receiver connected to a duplex filter for simultaneously transmitting and receiving signals;

selectively shifting a transmit frequency in steps substantially equal to said selected increment; and selectively connecting a high frequency channel stepper to said receiver through a low frequency offset channel stepper to shift a receive frequency from the transmit frequency either a first selected offset amount in a first mode or a second offset amount in a second mode.

17. The method of claim 16, wherein said first selected offset amount provides a designated duplex spacing between the transmit frequency and the receive frequency.

18. The method of claim 16, wherein said first selected offset amount provides a designated duplex spacing +/− an associated receiver intermediate frequency and +/− an associated transmitter intermediate frequency.

19. The method of claim 16, wherein said second offset amount is different from said first selected offset amount.

20. The method of claim 16, further comprising the steps of:

selectively connecting said high frequency channel stepper directly to said receiver when said device is in a camping mode not transmitting a signal;

shifting the receive frequency the first selected offset amount when said device is in a normal communicating mode; and shifting the receive frequency the second selected offset amount when said device is in a slotted communicating mode.

21. The method of claim 16, wherein said first selected offset amount provides a designated duplex spacing +/− an associated receiver intermediate frequency.

22. The method of claim 16, wherein said first selected offset amount provides a designated duplex spacing +/− an associated transmitter intermediate frequency.

* * * * *